(12) United States Patent
Bagchi et al.

(10) Patent No.: US 10,242,310 B2
(45) Date of Patent: *Mar. 26, 2019

(54) TYPE EVALUATION IN A QUESTION-ANSWERING SYSTEM

(71) Applicant: International Business Machines Corporation, Armonk, NY (US)

(72) Inventors: Sugato Bagchi, White Plains, NY (US); Mihaela A. Bornea, White Plains, NY (US); James J. Fan, Mountain Lakes, NJ (US); Aditya A. Kalyanpur, Westwood, NJ (US); Christopher Welty, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,536

(22) Filed: Jan. 11, 2017

(65) Prior Publication Data

US 2017/0154256 A1 Jun. 1, 2017

Related U.S. Application Data

(63) Continuation of application No. 14/286,334, filed on May 23, 2014, now Pat. No. 9,569,503.

(51) Int. Cl.
*G06F 17/30* (2006.01)
*G06N 3/00* (2006.01)
(Continued)

(52) U.S. Cl.
CPC ......... *G06N 3/006* (2013.01); *G06F 17/3053* (2013.01); *G06F 17/30687* (2013.01);
(Continued)

(58) Field of Classification Search
CPC ...................................................... G06F 17/30
See application file for complete search history.

(56) References Cited

U.S. PATENT DOCUMENTS

| 7,533,096 B2 | 5/2009 | Rice et al. |
| 2008/0201132 A1* | 8/2008 | Brown ............... G06F 17/2785 704/9 |

(Continued)

OTHER PUBLICATIONS

List of IBM Patents or Patent Applications Treated as Related.
IPCOM000180723D (System and Method for Type Coercion), Mar. 16, 2009, http://ip.com/pdf/ipcompad/IPCOM000180723D.pdf.

*Primary Examiner* — Khanh B Pham
(74) *Attorney, Agent, or Firm* — Scully, Scott, Murphy & Presser, P.C.

(57) ABSTRACT

A system and method for automatically mapping LATs and candidate answers to multiple taxonomies without a need to merge these taxonomies. The method includes using a syntactic analysis of a corpus to extract all type instances of the LAT. The extracted instances are then mapped to a given taxonomy and clustered in a set of supertypes. Each supertype receives a score based on the coverage of LAT instances in the corpus. The method includes mapping the candidate answer to the same taxonomy to determine if the candidate answer is an instance of a significant supertype. Then the score of a candidate answer is obtained by aggregating or taking a maximum of the score of the matched significant supertypes. This score evaluates the type match between the LAT and candidate answer for a taxonomy. Multiple taxonomies can be used to increase the chance of LAT and candidate answer mapping.

18 Claims, 14 Drawing Sheets

(51) Int. Cl.
  *G06N 5/02*     (2006.01)
  *G06N 7/00*     (2006.01)
(52) U.S. Cl.
  CPC ......... *G06F 17/30864* (2013.01); *G06N 5/02* (2013.01); *G06N 7/005* (2013.01)

(56) References Cited

U.S. PATENT DOCUMENTS

| | | |
|---|---|---|
| 2011/0307435 A1* | 12/2011 | Overell ................ G06F 17/278 706/46 |
| 2012/0078636 A1 | 3/2012 | Ferrucci et al. |
| 2012/0078890 A1* | 3/2012 | Fan ........................ G09B 7/00 707/723 |
| 2012/0301864 A1 | 11/2012 | Bagchi et al. |
| 2014/0006012 A1 | 1/2014 | Zhou et al. |
| 2014/0129492 A1 | 5/2014 | Petri et al. |
| 2014/0172757 A1 | 6/2014 | Liu |

* cited by examiner

| | | | |
|---|---|---|---|
| 0 | C0007995 | Chemicals and Drugs (MeSH Category) | 0.961 |

301

| | | | |
|---|---|---|---|
| 1 | C0600505 | Chemical Actions and Uses | 0.901 |
| 2 | C0600511 | Pharmacologic Actions | 0.901 |
| 3 | C1258064 | Therapeutic Uses | 0.895 |
| 4 | C0007680 | Central Nervous System Agents | 0.891 |
| 5 | C0003286 | Anticonvulsants | 0.857 |
| 6 | C0006949 | Carbamazepine | 0.180 |
| 7 | C0069751 | oxcarbazepine | 0.021 |
| 6 | C0060926 | gabapentin | 0.135 |
| 6 | C0031507 | Phenytoin | 0.133 |

| | | | |
|---|---|---|---|
| 1 | C0019398 | Heterocyclic Compounds | 0.385 |
| | C0031412 | Phenobarbital | 0.122 |
| | C0031507 | Phenytoin | 0.133 |

FIG. 3A

| 0 | C0002784 | Analytical, Diagnostic and Therapeutic Techniques and Equipment | 0.423 | RL 0.215 | — 351
|---|---|---|---|---|
| 1 | C0543467 | Operative Surgical Procedures | 0.208 | |
| 1 | C0039796 | The science and art of healing | 0.179 | |
| 2 | C0013216 | Pharmacotherapy | 0.043 | |
| 2 | C0017313 | patient care | 0.039 | |
| 3 | C0002423 | ambulatory care services | 0.018 | |
| 3 | C0030231 | Palliative Care | 0.015 | |
| 3 | C0019993 | Hospitalization | 0.006 | |
| 2 | C0013969 | Emergency treatment | 0.038 | |
| 3 | C0035273 | Resuscitation procedure | 0.012 | |
| 4 | C0035205 | Respiration, Artificial | 0.012 | |

360

| 0 | C0007995 | Chemicals and Drugs | 0.444 | RL 0.244 | — 361
|---|---|---|---|---|
| 1 | C0600505 | Chemical Actions and Uses | 0.200 | |
| 2 | C0600511 | Pharmacologic Actions | 0.200 | |
| 3 | C1258063 | Physiological Effects of Drugs | 0.200 | |
| 4 | C0019934 | Hormones, Hormone Substitutes, and Hormone Antagonists | 0.110 | |
| 5 | C0019932 | Hormones | 0.106 | |
| 6 | C0001617 | Adrenal Cortex Hormones | 0.065 | |
| 7 | C0017710 | Glucocorticoids | 0.031 | |

FIG. 4

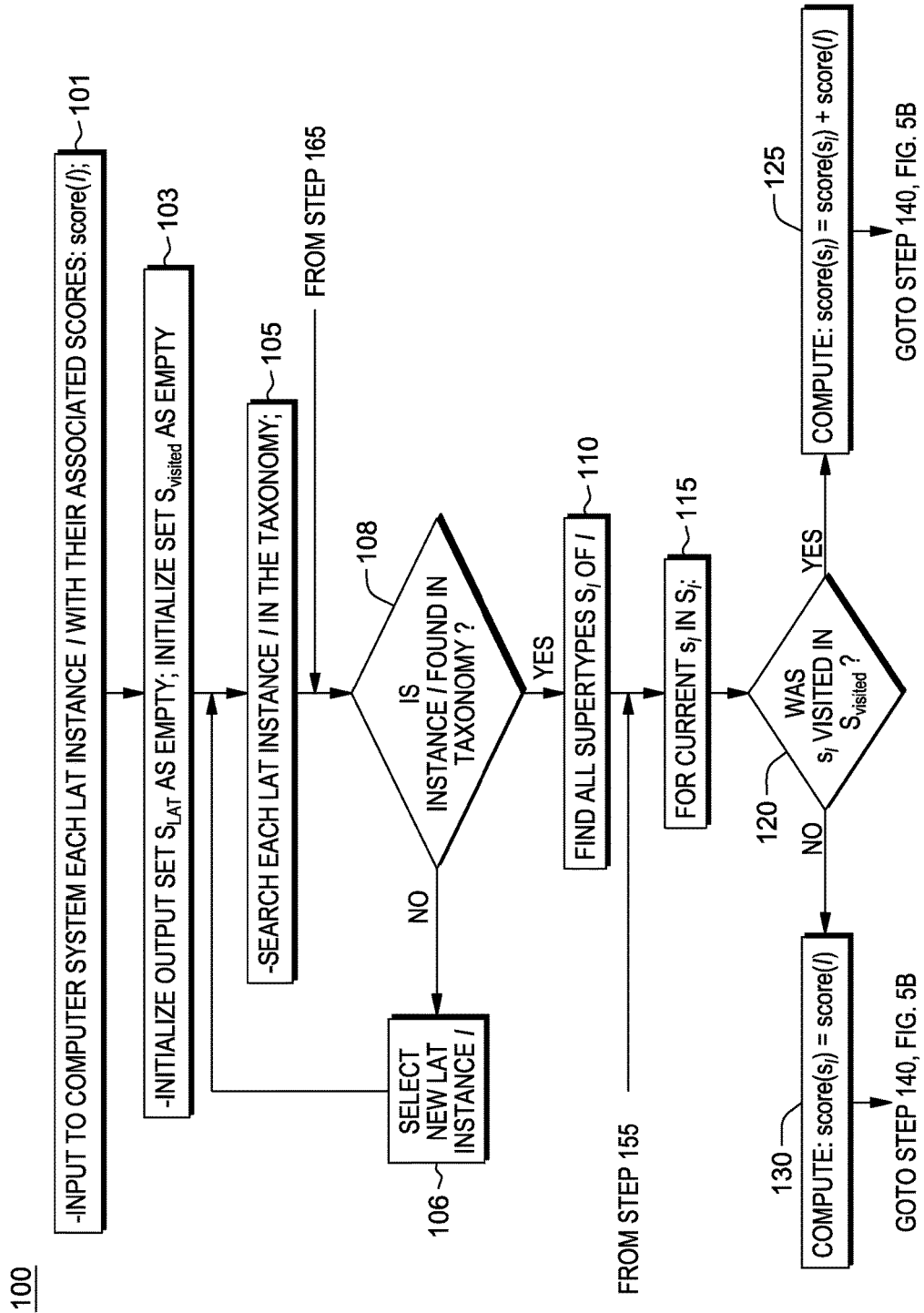

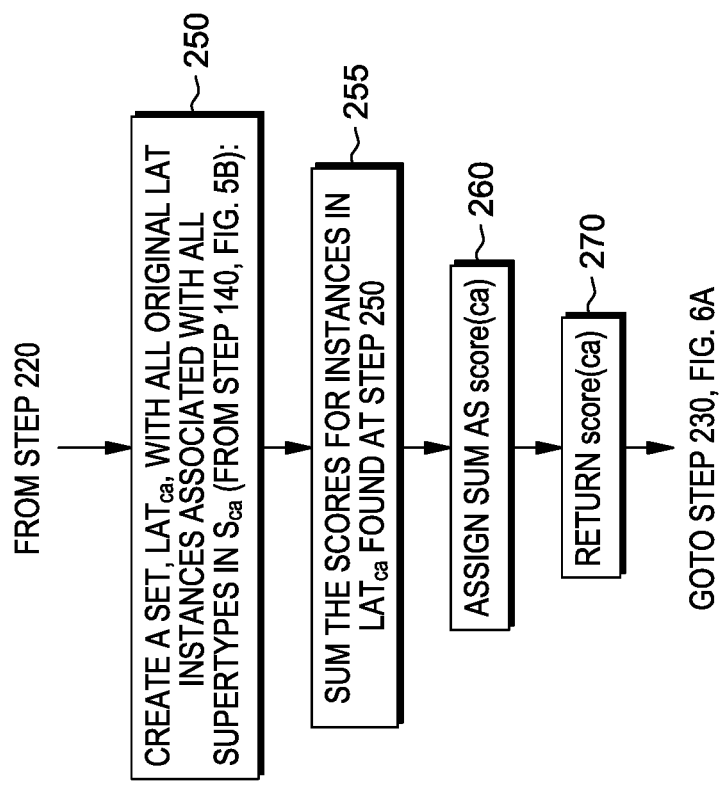

TYPE EVALUATION IN A QUESTION-ANSWERING SYSTEM

BACKGROUND

The disclosure relates generally to question answering systems, and more particularly, relates to type evaluation for determining a valid answer to a question in a question answering system.

In general, question answering is a computer science discipline concerned with building systems that automatically answer natural language questions. One approach to determining a valid answer to a natural language question is type evaluation. An existing type evaluation solution requires mapping both a lexical answer type (LAT) for a question and the candidate answer to a structured taxonomy and checking for a path between them. This solution works properly when the LAT and the candidate answer exist in the same taxonomy. However, this is often not case for an open-domain natural language question answering system where a wide variety of words can be used to specify the LAT and candidate answer.

There is a need for an improved solution for type evaluation used in question answering systems.

BRIEF SUMMARY

Embodiments of the invention provide for a dynamic infrastructure and methodology for performing type evaluation for determining a valid answer to a question in a question answering system, and combining multiple taxonomies for type evaluation in a question-answering system.

In one embodiment, the method comprises type evaluations for a LAT and candidate answer using multiple taxonomies without a need to merge these taxonomies. It does so by using a syntactic analysis of the text corpus to extract all type instances of the LAT. The extracted instances are then mapped to a given taxonomy and clustered in a set of significant supertypes. Each significant supertype receives a score based on the coverage of LAT examples in the corpus. When matching the LAT to a candidate answer, the candidate answer is mapped to the same taxonomy to determine if the candidate answer is an instance of a significant supertype.

In one embodiment, the score of a candidate answer is obtained by aggregating or taking a maximum score of the matched significant supertypes. This score evaluates the type match between the LAT and candidate answer for a taxonomy. Multiple taxonomies can be used to increase the chance of LAT and candidate answer mapping.

The same technique is applied for each taxonomy and the candidate answer receives the maximum score across all considered taxonomies.

An aspect of the invention thus provides a system and computer-implemented method for scoring candidate answers to questions. The method comprises receiving a natural language question into a computer-implemented question answering system. Then, applying syntactic analysis on the question to determine a lexical answer type (LAT) for the question. A second question based the LAT is generated. One or more LAT instances are identified by inputting the generated second question through the question answering system. The one or more LAT instances are mapped to one or more taxonomies. In the one or more taxonomies, one or more supertype entities associated with the mapped LAT instances are identified. A type evaluation score for a candidate answer is generated based on a match between the candidate answer and a supertype entity within a taxonomy. One or more answers to the question are generated, wherein each answer has an associated confidence score based at least in part on the type evaluation score.

A computer program product is provided for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

FIG. 3A depicts example results of the processing method for mapping LAT instances from the corpus to nodes in a taxonomy structure;

FIG. 4 depicts an example mapping of a LAT instance from the corpus to multiple taxonomy nodes in a single taxonomy structure;

FIGS. 5A-5C depict a method 100 run in a computer system for mapping the found LAT instances from a corpus to a node(s) of a taxonomy structure;

FIGS. 6A-6B depict the processing in a computer system of a method 200 for mapping the found candidate answers found (for the LAT instances) to a node(s) of the taxonomy structure;

DETAILED DESCRIPTION

Figure 1:
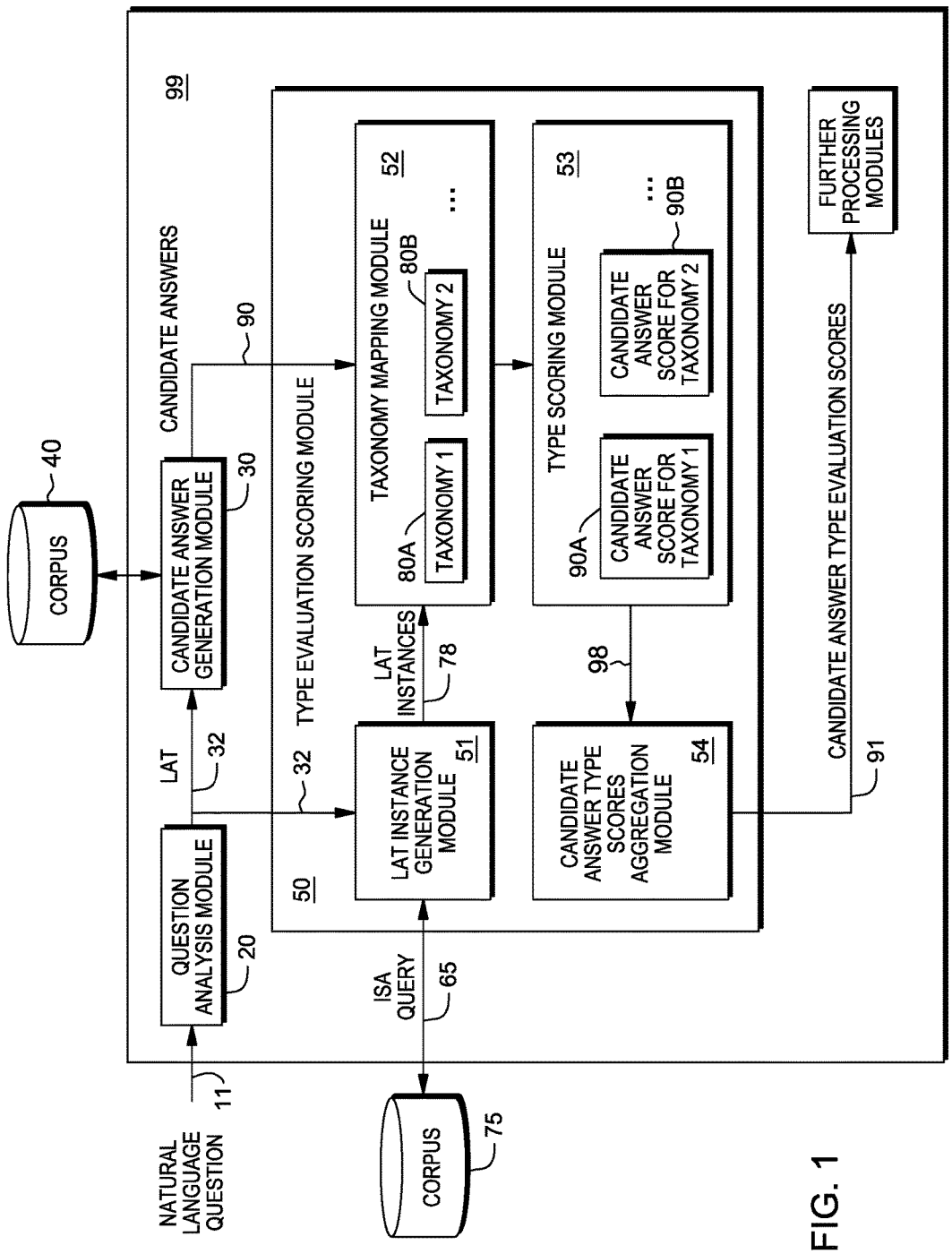
FIG. 1 shows a conventional high-level QA system architecture 99 that may employ the systems and methods described herein.

The present invention applies to question answering systems. Specifically, the present invention pertains to evaluating whether a candidate answer matches a LAT. This process is called type evaluation and is a known method of scoring or determining an answer to a question in question answering system.

The terms "question" and "query" are used herein interchangeably and refer to the same concept, namely—a request for information.

As referred to herein, a Lexical Answer Type (LAT) of a question is a descriptor of an entity that is a valid answer to the question. For example, in the question "What is a cause for skin rash?" the LAT includes a "cause." In other words, a valid answer to the question is likely a type of "cause". Typically, this would be verified by matching a candidate answer and LAT to a taxonomy and identifying a path between them to determine if the candidate answer is a type of cause. However, a drawback to this approach is that it doesn't work if either the candidate answer or the LAT does not exist in the taxonomy. This is a significant problem for general terms such as "cause" which may refer to a broad set of concepts such as diseases, chemical substances, etc. In order to overcome this limitation, one potential solution has been to add multiple taxonomies and manually mapping entities between the taxonomies to create a larger combined taxonomy. However, creating such a combined taxonomy can be prohibitively expensive to develop and maintain, and still may not be sufficient to perform type evaluation for general or ambiguous LATs.

Generally, a taxonomy is a data structure composed of an arrangement of units, such as nodes, interconnected by edges. Typically the units in the taxonomy are related by parent-child relationships. In one embodiment, a child in the taxonomy has by definition the same constraints as the parent plus one or more additional constraints. Accordingly, a taxonomy representation may include a hierarchical structure for classifying data. The taxonomy may be associated with a domain, for example, a medical domain. Nodes and links may have associated one or more attributes, e.g., label attributes, and such attributes may be application-dependent.

The present invention provides an improved solution for performing type evaluation. Furthermore, embodiments of the invention allow for use of multiple taxonomies for type evaluation without requiring a merger of the taxonomies to create a larger combined taxonomy.

The present invention makes use of a text corpus to identify instances that align to a LAT in order to map the LAT to one or more taxonomies. As an example, assume that the LAT identified for a question is the term "cause". The term "cause" is very general and unlikely to exist as a node in a taxonomy. However, using syntactic analysis of a corpus of text it's possible to identify instances of causes, map them to nodes in one or more taxonomies, identify one or more "significant supertype" nodes for all the instance nodes, and then identify a path between the significant supertype nodes and the candidate answers. For example, instances of the phrase "cause" in a medical text corpus may refer to various kinds of diseases, bacteria, or chemicals. The terms disease, bacteria and chemical are much more likely to exist in a medical taxonomy, and can be identified as significant supertype nodes based on instances of causes extracted from a corpus. Once the significant supertypes of disease, bacteria and chemical are identified, the candidate answers can be type evaluated with respect to those significant supertypes, and then the significant supertype scores can be used to create an overall candidate answer type score for the original LAT of "cause". The present invention addresses the determining of significant "supertypes" of the LAT instance.

The present invention described herein may be implemented in a QA system for the purposes of scoring candidate answers. The QA system may be any probabilistic or confidence scoring QA system that performs type evaluation using taxonomies for the purposes of determining a probability or confidence for an answer. A preferred QA system is the IBM Watson QA system, or instances of the IBM Watson system, developed by IBM and described with greater detail in the IBM Journal of Research and Development, Volume 56, Number 3/4, May/July 2012, the contents of which are hereby incorporated by reference in its entirety. In one embodiment, the QA system executes on a computer system having hardware processing elements such as shown and described herein with respect to FIG. 8. In such a QA system 99 such as shown in FIG. 1, the architecture employs a search engine (e.g., a document retrieval system) as a part of Candidate Answer Generation module 30 to generate candidate answers 90 and which may employ tools for searching a corpus 40, e.g., which may include data found in web pages on the Internet, a publicly available database, a web-site, a privately available collection of documents or, a privately available database.

FIG. 1 illustrates system functionality for automatically mapping a LAT to a taxonomy according to the present invention. Type evaluation in QA system 99 involves receiving a natural language question 11. The question 11 is analyzed in a question analysis module 20 to identify a lexical answer type, or LAT 32, for the question 11. In the type evaluation scoring module 50, instead of mapping the LAT 32 directly to a taxonomy, instances 78 of the LAT 32 are identified from a corpus 75 using a LAT instance generation module 51. The LAT instances 78 are identified by generating a query 65 based on the received LAT 32. The generated query is input into a search engine to search the corpus 75 to identify instances 78 of the LAT 32. The search engine is in operative communication with the corpus 75, for example, via a data communications network or alternatively, is directly connected with such data corpus. The search engine is configured to automatically search the data corpus contents, which may be unstructured or semi-structured text, to identify entities satisfying the query. In certain embodiments, the corpus may be domain specific, meaning the content is relevant to a particular subject matter, for example, the corpus 75 may include content in the medical domain.

In one embodiment, the generated query is an "ISA" relation query 65 based on the LAT 32. The search engine (not shown) performs an "ISA" search query 65 against the corpus 75 contents to generate LAT instances 78. For each LAT instance 78 an associated score is also generated from the search. The score indicates a confidence or probability that the LAT instance 78 identified is, in fact, an instance of the LAT.

For illustrative purposes, the following is a description of the process of identifying LAT instances 78 according to the present invention based on "surgical option" as an example LAT 32. A "surgical option" is a generic term and may not exist in a taxonomy even within the medical domain. Given "surgical option" as a LAT 32, aspects of the present invention will generate a query 65 and identify instances 78 of "surgical option" from a corpus 75, for example, a medical domain corpus. The following examples below are results of instances 78 of "surgical option" identified from searching the corpus 75. Each instance includes an associated score representing a degree of confidence or probability that each instance is an instance of a "surgical option".

| | |
|---|---|
| gastrojejunostomy | 0.017 |
| surgical method | 0.004 |
| craniotomy | 0.160 |
| glanuloplasty | 0.035 |
| lobectomy | 0.017 |
| arthroscopy | 0.006 |
| arthroscopic capsular release | 0.009 |
| mitral valve repair | 0.016 |

In this example, the LAT instance generation module 51 creates an "ISA" search query 65, for example, "X is a surgical option" or "X is an example of a surgical option". The ISA patterns include rules that are applied to natural language text to detect the LAT instances 78 from the text documents in the corpus 75. For example, a phrase in a text document in the corpus 75 may include, "Craniotomy is a surgical option for treating . . . " The ISA pattern is only one example of a type of pattern that could be used to identify instances 78 of a LAT 32.

As shown, the LAT instance "craniotomy" has a higher associated score than "surgical method" representing a higher confidence that "craniotomy" is an instance of a "surgical option" compared to a lower confidence that "surgical method" is an instance of a "surgical option." Generally, the score may be based on a higher number of pattern matches in the corpus 75.

After obtaining the LAT instances 78 from the corpus 75, in the taxonomy processing mapping block 52 each instance 78 and the candidate answers 90 obtained from a candidate answer generation module 40 that is part of the QA system 99 are mapped to nodes (or entities) in one or more taxonomies 80A, 80B. The number of taxonomies is not limited and may include any number of relevant taxonomies. For example, in the medical domain, example taxonomies may include the SNOMED taxonomy or the MeSH taxonomy. The taxonomy tree-like structure generally includes a hierarchical structure of parent nodes representing more general concepts and children nodes representing more specific concepts. For example, in the medical domain, a parent node may be "surgical procedure" having many child nodes divided according to body parts or method used. A medical taxonomy may include procedures, treatments, medications, and other medical concepts.

After the instances 78 are mapped to nodes in the taxonomies 80A, 80B, significant supertype nodes are identified within the one or more taxonomies 80A, 80B. The details of determining a significant supertype node are described in detail with reference to FIGS. 3A-3B and FIG. 4.

Referring back to FIG. 1, after the significant supertype nodes and the candidate answer nodes are identified in the one or more taxonomies 80A, 80B, the type scoring module 53 will generate type scores for each taxonomy. For example, if two taxonomies used are the SNOMED and the MeSH taxonomies, then for each candidate answer, a first type score 90A will be generated for the SNOMED taxonomy based on the LAT significant supertypes identified within it, and a second type score 90B will be generated for the MeSH taxonomy based on the LAT significant supertypes identified within it. For each taxonomy and each candidate answer a type score may be generated. Next, all the type scores 98 for each candidate answer are combined in a candidate answer type scores aggregation module 54. The type scores 98 may be combined using any method including a summing, averaging or taking a maximum, to generate an overall candidate answer type evaluation score 91.

In other words, for each taxonomy, it is determined which candidate answers map to the significant supertypes. From this, scores are obtained for each candidate answer per taxonomy which are used to determine type evaluation scores for each candidate answer based on the matches to the significant supertypes identified. For each candidate answer and taxonomy the type evaluation score can be a sum, average or maximum. By obtaining a score for each candidate answer and taxonomy based on significant supertype nodes, the scores can be combined to provide an overall candidate answer type evaluation score 91 such as by the aggregation module 54.

Figure 2:
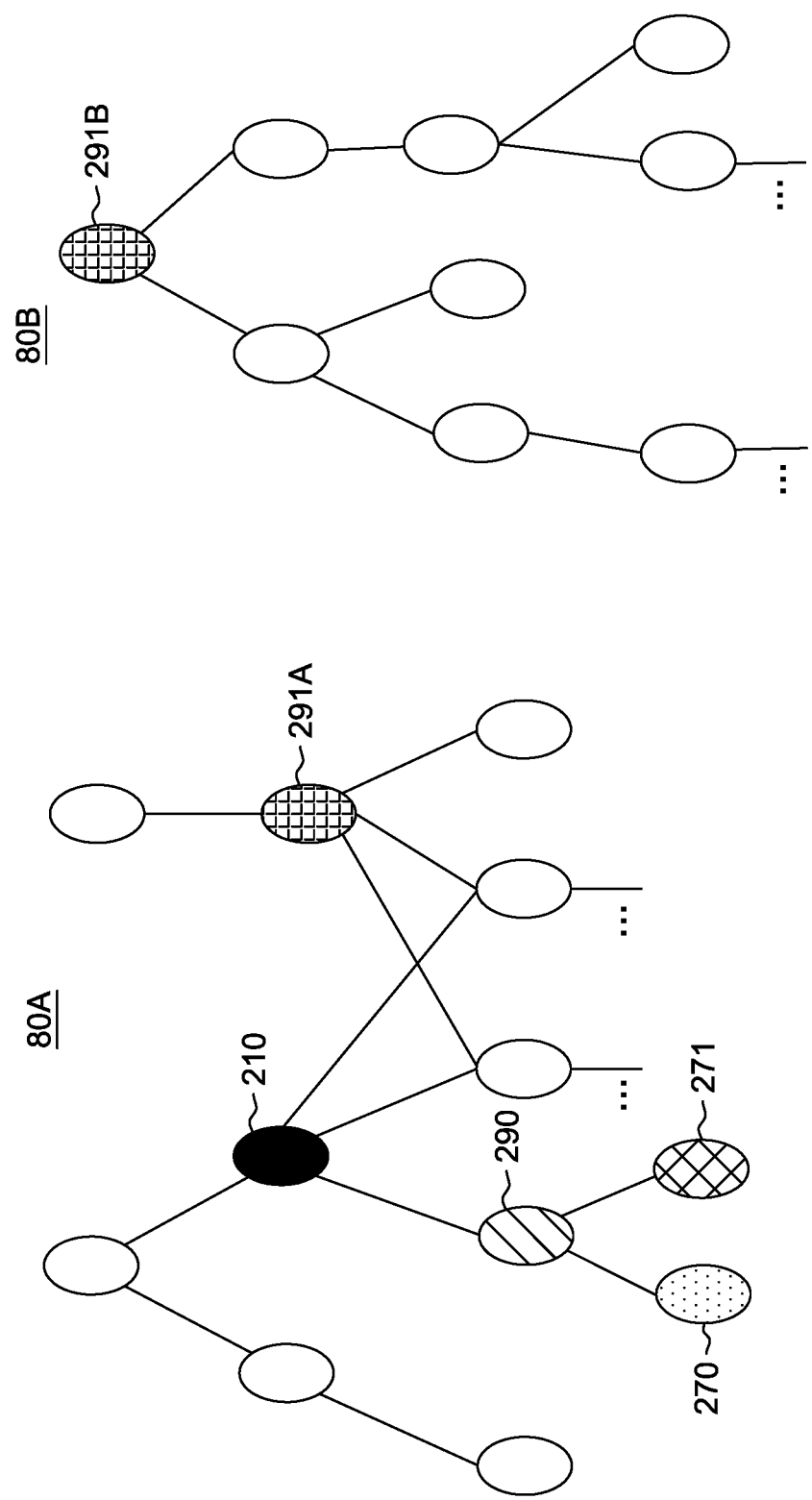
FIG. 2 illustrates taxonomies and the mapping of LAT instances and candidate answers to the taxonomies.

FIG. 2 illustrates taxonomies and the mapping of LAT instances and candidate answers to the taxonomies, and the identification of significant supertype nodes. A significant supertype node may be any node in the taxonomy that is a parent node of the instance node, or the instance node itself. Using a hierarchical tree graph taxonomy the instance nodes will link to parent nodes that may serve as significant supertype nodes. In a hierarchical tree graph taxonomy the most general nodes, or those nodes having no other parent nodes, are referred to as the top nodes. For example, for taxonomy 80A there are two top nodes shown, while in taxonomy 80B there is only one top nodes shown. It is possible that a top node precisely represents a LAT instance and in such situations those top nodes are the significant supertype of the LAT instance. In other situations where the instance node is not the top node, then a significant supertype node will be identified.

As shown in FIG. 2, each taxonomy 80A, 80B includes nodes with edges connecting the nodes. Each node may have associated labels containing information on the concept or term represented by each node. The candidate answers 90 are mapped to the taxonomies 80A, 80B by matching to labels of the nodes. As shown, a first candidate answer is mapped to a node 290 of a first taxonomy graph structure 80A, and a second candidate answer is mapped to both a first node 291A in the first taxonomy 80A and a second node 291B in the second taxonomy 80B. Furthermore, each LAT instance 78 is mapped to each of the taxonomies 80A, 80B by matching to labels of the nodes. As shown, in the first taxonomy 80A, a first LAT instance is mapped to a node 270 and a second LAT instance is mapped to a node 271. No LAT instances are shown to match with any nodes in the second taxonomy 80B.

Once the LAT instances are mapped to the taxonomies, significant supertype nodes 210 are identified according to the process described with reference to FIGS. 3A-3B and FIG. 4 below. Lastly, type scores are identified for each candidate answer/taxonomy based on the identified significant supertype nodes. For example, the first candidate answer/first taxonomy will have a type score based on the link between the first candidate answer node 290 and the significant supertype node 210, and the second candidate answer/first taxonomy will have a type score based on the links between the second candidate answer node 291A and the significant supertype node 210. No scores or null scores will exist for the second taxonomy and each of the candidate answers since no LAT instances were identified. This is true even for the second candidate answer despite a matching node 291B having been identified. The scores of a candidate answer and each taxonomy can then be combined into an overall score type evaluation score for that candidate answer.

Figure 3B:
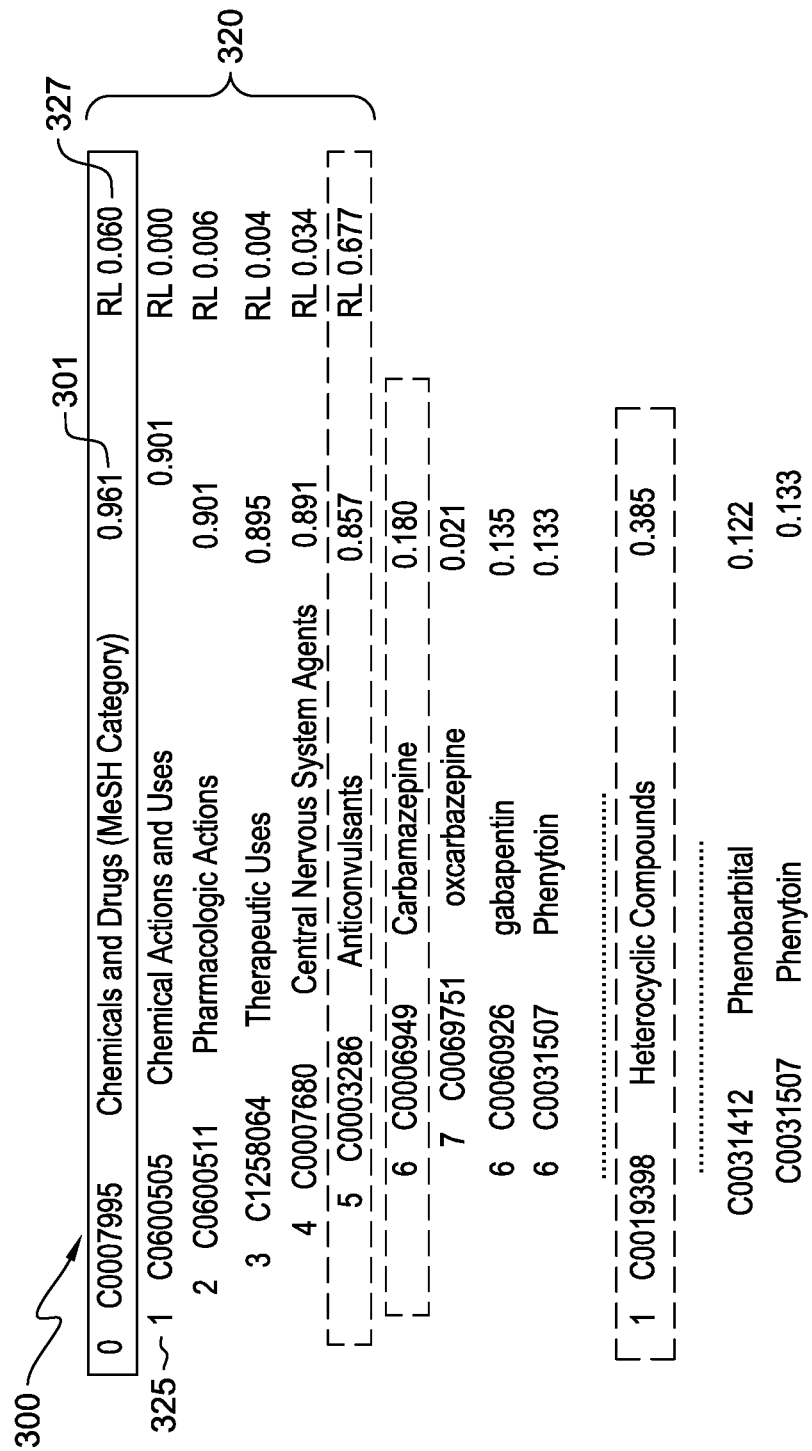
FIG. 3B shows example results of computing a recall loss (RL) number associated with each node corresponding to the LAT instance and/or significant supertype nodes found in the taxonomy in one embodiment.

FIGS. 3A-3B illustrate the method for identifying significant supertype nodes in a taxonomy given LAT instances. In this example, use is made of the Medical Subject Headings (MeSH) taxonomy structure available through the PUBMED® (Trademark of United States National Library of Medicine) search engine adapted to access primarily databases of references and abstracts on life sciences and biomedical topics.

In FIG. 3A, an example LAT identified from the question analysis is "Anticonvulsive Drug". A query is generated based on the LAT of "Anticonvulsive Drug" and a corpus is searched for instances of the LAT existing in the corpus. In FIG. 3A, a representation is shown of results after LAT instance mapping. A first node 300 of the taxonomy indicated as "Chemical and Drugs" is considered a most general or top supertype node. As indicated by the value 301 of 0.961, the node 300 covers 96.1% of the instances found in the corpus. That is, 96.1% of all nodes matching the LAT instances are child nodes of the "Chemicals and Drugs" supertype node 300. Nodes 305 are also shown to have significant coverage portions of the LAT instances albeit having less coverage for each child node than its parent node.

FIG. 3B shows example results of the generated RL numbers 320 for the example shown in FIG. 3A. A computed recall loss number indicates the difference in the percentage of LAT instances covered by that LAT node compared to its child node in the taxonomy. Traversing down each level, it may be determined what percentage of instances are being lost, and when a certain threshold RL value is reached the traversal is stopped. For example, a difference between the score (0.961) of the first top supertype node "Chemicals and Drugs" 300 and the next child "Chemical Actions and Uses" 325 having a score (0.901) provides a recall value 327 as 0.060. Traversing down one level, the computed recall value is determined as 0.000 since the coverage values for supertype node "Chemical Actions and Uses" and the next child in the taxonomy labeled "Pharmacologic Actions" are identical. The process stops at the significant supertype "Anticonvulsants" with a recall loss of 0.677, exceeding a threshold.

In other words, starting from a top node, the method is executed by observing the recall loss from parent node to a most popular child node. If the recall loss is greater than a threshold, the process terminates. When the process terminates, the parent node is then identified as a significant supertype node.

FIG. 4 is a further illustrative example that there may be multiple significant supertypes identified for a LAT in a single taxonomy. For example, in FIG. 4 the LAT identified for a question is "Treatment." The LAT instance are extracted from the corpus and mapped to taxonomy nodes and used to calculate coverage values the nodes. In the example the RL threshold value is 0.200. In FIG. 4 a first top supertype node 350, "Analytical, Diagnostic and Therapeutic Techniques and Equipment" has a coverage value of 0.423. It is further shown that a corresponding RL number 351 is 0.215, thus satisfying the threshold value and identified as a significant supertype node. A second top supertype node 360, e.g., "Chemicals and Drugs" has a coverage value of 0.444 and a RL value 361 of 0.244, thus also satisfying the threshold value and identified as a significant supertype node. Thus, there are identified two significant supertypes for the original LAT of "Treatment."

Figure 5B:
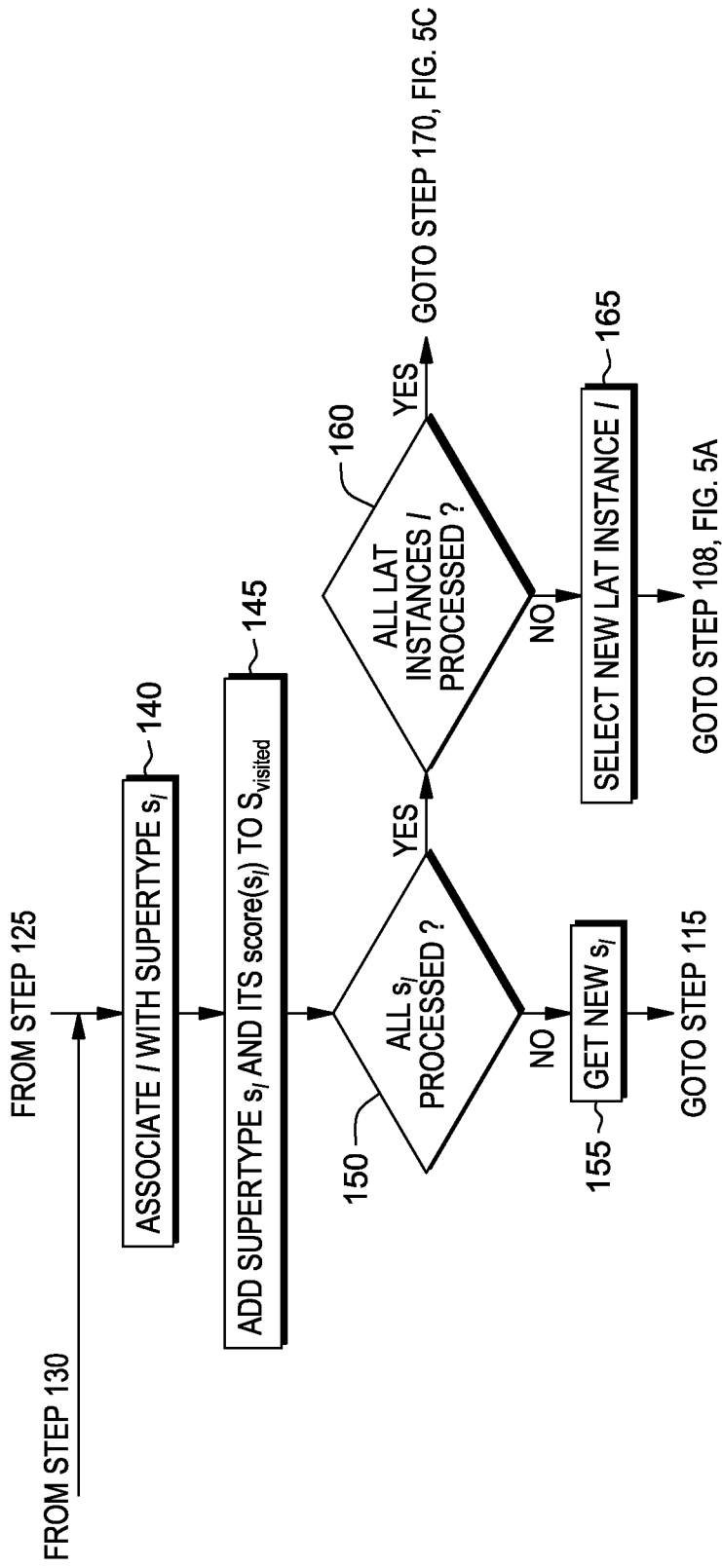
Figure 5C:
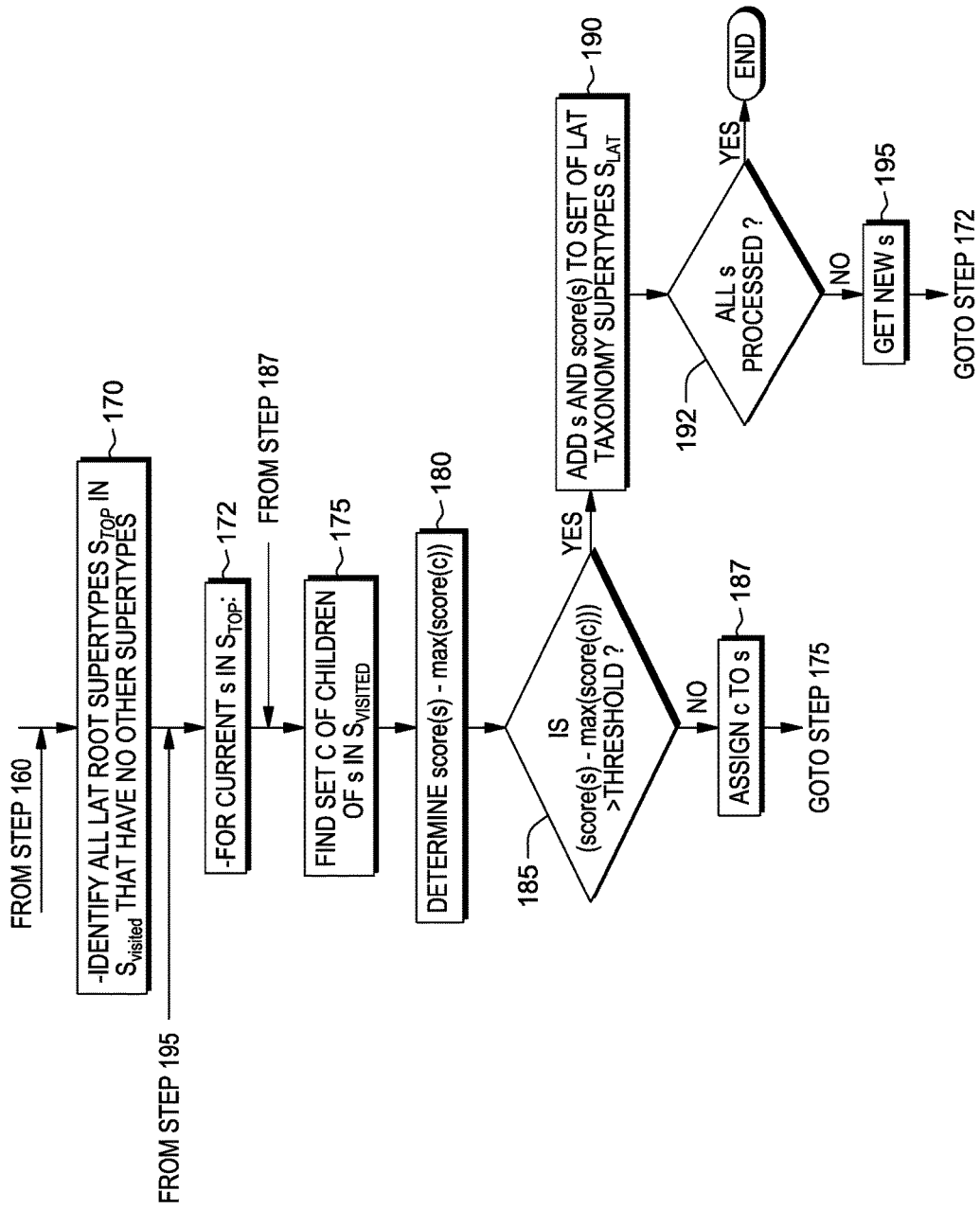

FIGS. 5A-5C illustrate methods of type evaluation scoring according to the present invention. As shown in FIG. 5A, a first step 101 receives or accesses as input each of the LAT instances "l" with their associated scores: score(l). The LAT instance data may be stored in and retrieved from a memory storage device. Then, at step 103, the method initializes two sets as empty (no content): an output set of LAT significant supertypes ($S_{LAT}$), and a set of all supertypes of each LAT instance found in the taxonomy search ($S_{visited}$). Then, at step 105, a taxonomy structure is searched to identify nodes matching each LAT instance l. The techniques to find a given LAT instance in the taxonomy vary from text look-up to more complex techniques using taxonomy specific properties. However, if a LAT instance is not found, as determined at step 108, the method returns to obtain a new LAT instance l, as indicated by the return to step 106. If a LAT instance l is found in a taxonomy at 108, the method proceeds to step 110 where the taxonomy search is conducted to find all supertypes $S_l$ of each LAT instance l. $S_l$ is the set of supertypes for LAT instance l. That is, once the LAT instance node is found, the edges in the taxonomy (e.g., implementing ISA type relations) are used to find the supertypes. This process is recursive and it ends when the "top" nodes of the taxonomy are reached. The "top" nodes have no supertypes and are the most general nodes in the taxonomy.

Referring back to step 110, the supertypes of all LAT instances are unioned in the set $S_{visited}$. Continuing to step 115, for each current supertype $s_l$ in set $S_l$, a determination is made at step 120 whether the current $s_l$ in $S_l$ has already been visited in the taxonomy. This step is to memorialize that the supertype $s_l$ in $S_l$ has been prior found in the taxonomy in connection with another searched LAT instance. Thus, if $s_l$ was prior visited in $S_{visited}$, the method proceeds to step 125, which computes an updated score for the determined supertype $s_l$ having been prior visited in $S_{visited}$ according to:

$$score(s_l) = score(s_l) + score(l).$$

Otherwise, at step 120, if determined that the $s_l$ was not in $S_{visited}$ (i.e., $s_l$ was not prior visited in the taxonomy), the method proceeds to step 130, which computes a score for the determined supertype $s_l$ according to:

$$score(s_l) = score(l).$$

Generally, it is the case that initially all supertypes have a score (i.e. coverage score) of zero. In general a node in the taxonomy graph may be a supertype for more than one LAT instance. At step 125, the supertype of each LAT instance is updated with the LAT instance score which is input to the algorithm at 101. A particular supertype of LAT instance 2 might also be a supertype of LAT instance 1. After LAT instance 1 is processed, the score(s)=score (LAT instance 1). Subsequently, after LAT instance 2 is processed in the loop, score(s) is increased by the score(LAT instance 2), i.e. score(s)=score(LAT instance 1)+score(LAT instance 2). The final coverage score(s) is obtained after all LAT instances in the input have been processed.

Notwithstanding whether the current $s_l$ was prior visited in the taxonomy (as indicated by $S_{visited}$), after computing the current score for the $s_l$, the method proceeds to step 140, FIG. 5B, where the current LAT instance l is associated with supertype $s_l$. Then, the method proceeds to step 145, FIG. 5B, for adding the supertype $s_l$ and its computed score($s_l$) to set $S_{visited}$.

Continuing to step 150, a determination is made as to whether all supertypes $s_l$ have been found/processed in the taxonomy for the current LAT instance. If not all supertypes $s_l$ have been found/processed for the current LAT instance in the taxonomy, then the process proceeds to 155 to obtain a further supertype for processing for that LAT instance, and then returns to step 115, FIG. 5A for repeating the process steps 115-150 for mapping this new instance to the taxonomy for determining the supertypes.

Otherwise, at 150, FIG. 5B, if all supertypes $s_l$ have been found/processed for the current LAT instance in the taxonomy, then the process proceeds to 160, where a determination is made as to whether all of the LAT instances (from the corpus) have been processed for determining the significant supertypes. If all of the LAT instances (from the corpus) have been processed at this point and the found supertypes and associated scores stored in $S_{visited}$, the process proceeds to step 170, FIG. 5C. Otherwise, if there is another LAT instance that remains to be mapped to the taxonomy to determine significant supertypes, then the process proceeds to step 165 where a new LAT instance l is selected. Once selected, the process returns to step 108, FIG. 5A to determine whether the new instance l is found in the taxonomy and steps 110-150 are again repeated to find the supertypes and their associated scores.

Thus, it is the case that this method 100 is recursive and it ends when the top nodes of the taxonomy are reached. The top nodes have no supertypes.

The determination of which supertypes are significant supertypes and are to be added into set $S_{LAT}$ is described in more detail in FIG. 5C. That is, $S_{LAT}$ records the significant supertypes of the LAT.

Referring now to step 170, FIG. 5C, this step performs identifying all LAT top supertypes $S_{TOP}$ in $S_{visited}$ where $S_{TOP}$ is a subset of $S_{visited}$ such that none of the nodes in $S_{TOP}$ has any supertypes (i.e. have no parent nodes in the taxonomy). Particularly, for a current supertype "s" in $S_{TOP}$ at 172, the process proceeds to 175 find a set C of children "c" of each supertype in $S_{VISITED}$. Then, at 180, a recall loss (RL) number is computed according to:

$RL = \text{score}(s) - \max(\text{score}(c))$ where the RL is a number that may be used to evaluate when to stop searching for a significant supertype in the taxonomy graph. In the computation of the RL value, in one embodiment, score(c) is a computed coverage score associated with a child of a supertype and max(score(c)) is the coverage score for the most visited child node of said supertype node. The child c is maintained in the set $S_{VISITED}$, and the score(s) and score(c) was computed earlier in the loop in connection with the first algorithm steps 115 to 150, particularly, the processing loop that includes steps 125, 130. Then, proceeding to step 185, FIG. 5C, a determination is made as to whether the RL value for the supertype node is greater than a threshold value. In other words, at this step, it is determined whether too much information (too much of the score) will be lost if the method proceeds to the next child. If, at step 185, it is determined that the RL value is not greater than the threshold, then the process proceeds to step 187 where the current child "c" is assigned as the current supertype "s" in $S_{TOP}$. Then the process returns to step 175 to find a next child node c of s in $S_{VISITED}$, and the steps 175-185 are repeated for the next child.

Otherwise, if at step 185, it is determined that the RL value is greater than the threshold, then the process proceeds to step 190 where supertype "s" and a computed associated score(s) are added to the set of significant supertypes of the LAT $S_{LAT}$.

Then, proceeding to step 192, a determination is made as to whether all supertypes "s" have been processed from $S_{TOP}$. If not all supertypes s from $S_{TOP}$ have been processed, then the process proceeds to 195 to obtain a new supertype "s" for processing from $S_{TOP}$, and then the process returns to step 172, to repeat the process steps 175-190 for determining whether to include the supertype "s" and its associated computed score to the output set $S_{LAT}$.

Otherwise, if, at 192, it is determined that all supertypes s from $S_{TOP}$ have been processed in the taxonomy, then the process ends.

For the evaluation of candidate answers, the method is similar to that of mapping LAT instances, namely finding a node in the taxonomy with a label matching the candidate answer term or phrase. The candidate is more specific and generally has a direct match in the taxonomy. Thus, there is no need to find significant supertypes for the candidate answers. Given each candidate answer, the system determines whether there is a taxonomy link between the candidate and the significant supertypes of the LAT.

Figure 6A:
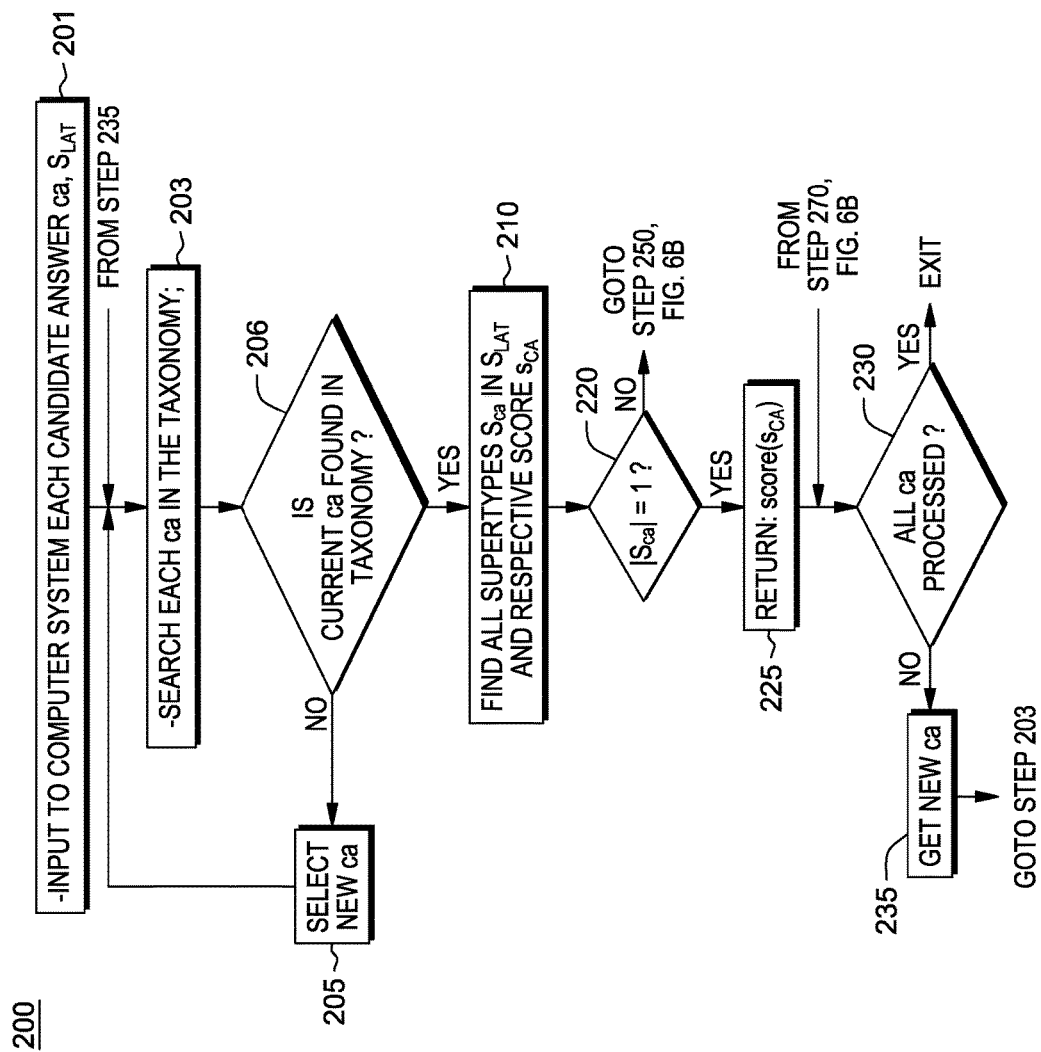

FIGS. 6A-6B depict the processing in a computer system of a method 200 for mapping the candidate answers to a taxonomy and providing a score for each candidate answer per taxonomy. As shown in FIG. 6A, a first step 201 receives or accesses as input each of the candidate answers (ca) and each of the significant supertypes found in set $S_{LAT}$. The output will be the candidate answer score: score(ca). Commencing at 203, FIG. 6A, for a current candidate answer (ca) the taxonomy is searched for a node having a label matching the candidate answer (ca).

At 206, a determination is made as to whether the current candidate answer (ca) is found in the taxonomy. The techniques to find a given entity (including a candidate answer) in the taxonomy vary from text look-up to more complex techniques using taxonomy specific properties. However, if a candidate answer is not found, as determined at step 206, the method returns to obtain a new candidate answer (ca), as indicated by the return to step 205 which obtains a new candidate answer for taxonomy search. Given that the candidate answer (ca) is found in the taxonomy at 206, the method proceeds to step 210 to find all supertypes $S_{ca}$ in the set $S_{LAT}$ of significant supertypes and their associated scores. Then, for the current candidate answer (ca), a determination is made at 220 as to whether the candidate answer (ca) matches only one significant supertype $s_{ca}$, i.e., ($|S_{ca}|=1$). If at 220, if it is determined that the ca matches more than one significant supertype, then the method proceeds to step 250, FIG. 6B. Otherwise, if it is determined that the candidate answer (ca) matches only one significant supertype, then the method returns the current score($S_{ca}$), i.e., the score($s_j$) at 225 associated with that one LAT significant supertype entity, and proceeds to determine if all the candidate answers have been processed at 230. If at 230, it is determined that not all candidate answers have been processed, then the method obtains the next candidate answer at 235, FIG. 6B and the process returns for loop processing at 203.

Otherwise, at step 220, once determined that the candidate answer (ca) matches more than one significant supertype, then the method proceeds to step 250, FIG. 6B where the method creates a set $LAT_{ca}$ with all original LAT instances associated with all significant supertypes in $S_{ca}$ (e.g., obtained from step 140, FIG. 5B). The set $LAT_{ca}$ is created so as to avoid redundancy for cases when an instance contributes to several significant supertypes of the LAT. Continuing, at step 255, FIG. 6B, the method calculates of sum of scores for instances in $LAT_{ca}$ at prior step 250. That is, the original LAT instances that contribute to each LAT significant supertype are aggregated. Further, continuing to step 260, the method performs assigning the sum as a score(ca) and returning the score(ca) as output at 270.

The scores for each significant supertype originate from the original LAT instances for which the significant supertypes are supertypes. In one embodiment, the scores are normalized, i.e., the scores for every instance sum up to a value of "1".

Preferably, the same scoring technique should be applied for each taxonomy, and then the score for the candidate answer is the maximum score across all considered taxonomies.

Figure 7:
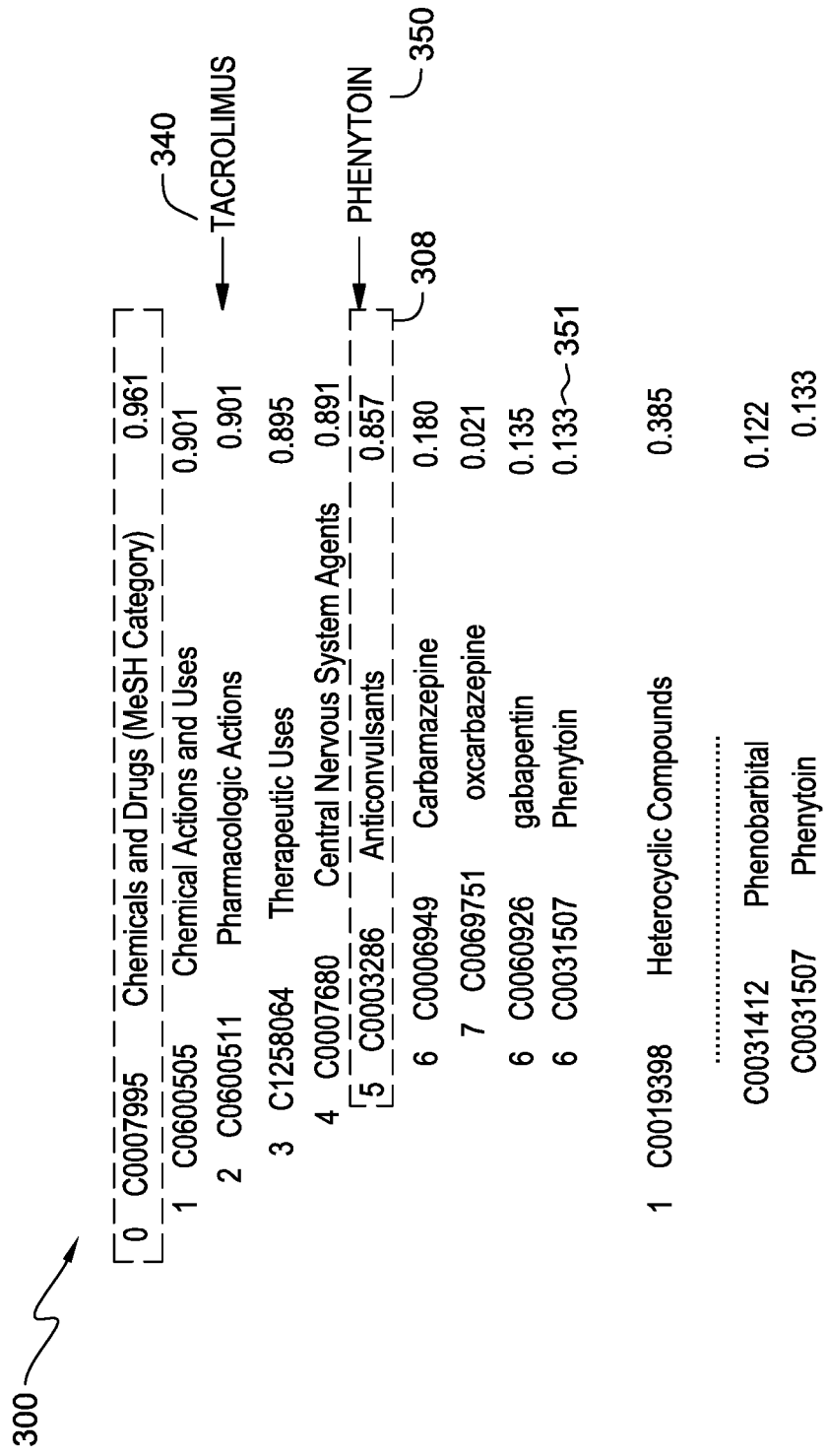
FIG. 7 shows example results of scoring a candidate answer against the found multiple significant supertypes of the LAT that it matches in an example taxonomy structure.

Referring now to FIG. 7, there is depicted example candidate answer scoring using a significant supertype identified in a single taxonomy.

In the example processing depicted in FIG. 7, the LAT is "Anticonvulsant Drugs" as was shown in FIGS. 3A and 3B. Again, a first node 300 of the taxonomy indicated as "Chemicals and Drugs" and is the most general, top, supertype, and the node indicated as "Anticonvulsants" 308 is the significant supertype.

As shown in FIG. 7, the example candidate answers include: "Phenytoin" 350 and "Tacrolimus" 340. Mapping each candidate answer "Phenytoin" 350 and "Tacrolimus" 340 in the taxonomy shows example matches to nodes in the single taxonomy labeled as:

C0031507 Phenytoin (node 351)
C0085149 Tacrolimus (not shown)

The method performs a check to determine if there is a path between each candidate answer and the LAT significant supertype(s) that would indicate that the candidate answer is a type matching the LAT. In the example shown, "Pheonytoin" node 351 maps to the significant supertype node "Anticonvulsants" 308 given the path in the taxonomy indicating that "Phenytoin" is a descendent of the node "Anticonvulsants" 308. As a result, the candidate answer "Phenytoin" receives a score of 0.857 for this taxonomy.

However, it is found that candidate answer "Tacrolimus" 340 is not mapped to "Anticonvulsants" since there is no path in the taxonomy indicating that "Tacrolimus" is descendent of the node "Anticonvulsants". As a result, the candidate answer "Tacrolimus" receives a score of 0.0 for this taxonomy.

In a further embodiment, in the method for scoring of the candidate answers, there is further performed combining scores for multiple significant supertypes. As previously mentioned, when there is overlap of supertype coverage in a single taxonomy, the original LAT instances from corpus are counted only once. That is, at step 250, FIG. 6B it is implicitly ensured that each original LAT instance is accounted only once by using the set $LAT_{ca}$ with all original LAT instances associated with all significant supertypes. The instances in this set are unique.

As a further illustrative of this, assuming a candidate answer maps to two significant supertypes $S1_{ca}$ and $S2_{ca}$. An example set of original LAT instances (with their given scores) contributing to each significant supertype is the following:

$S1_{ca}$: 11:0.05, 12:0.1, 13:0.07, 14:0.2===>score $(S1_{ca})$=0.05+0.1+0.07+0.2=0.42

$S2_{ca}$: 11:0.05, 12:0.1, 15:0.5===>score$(S2_{ca})$=0.05+ 0.1+0.5=0.65

The $S1_{ca}$ and $S2_{ca}$ have been computed at 140, FIG. 5B. Now to compute score(ca), the set $LAT_{ca}$ includes the cumulated instances of $S1_{ca}$ and $S2_{ca}$: i.e., $LAT_{ca}$: 11:0.05, 12:0.1, 13:0.07, 14:0.2, 15:0.5;

Resulting in a Score$(ca)$=0.05+0.1+0.07+0.2+ 0.5=0.92

However, computing score(ca)=score($S1_{ca}$)+score($S2_{ca}$) =0.42+0.65=1.07 is not correct as this value is greater than 1, and is a result of 11 and 12 being accounted for multiple times which is intentionally avoided in a preferred embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
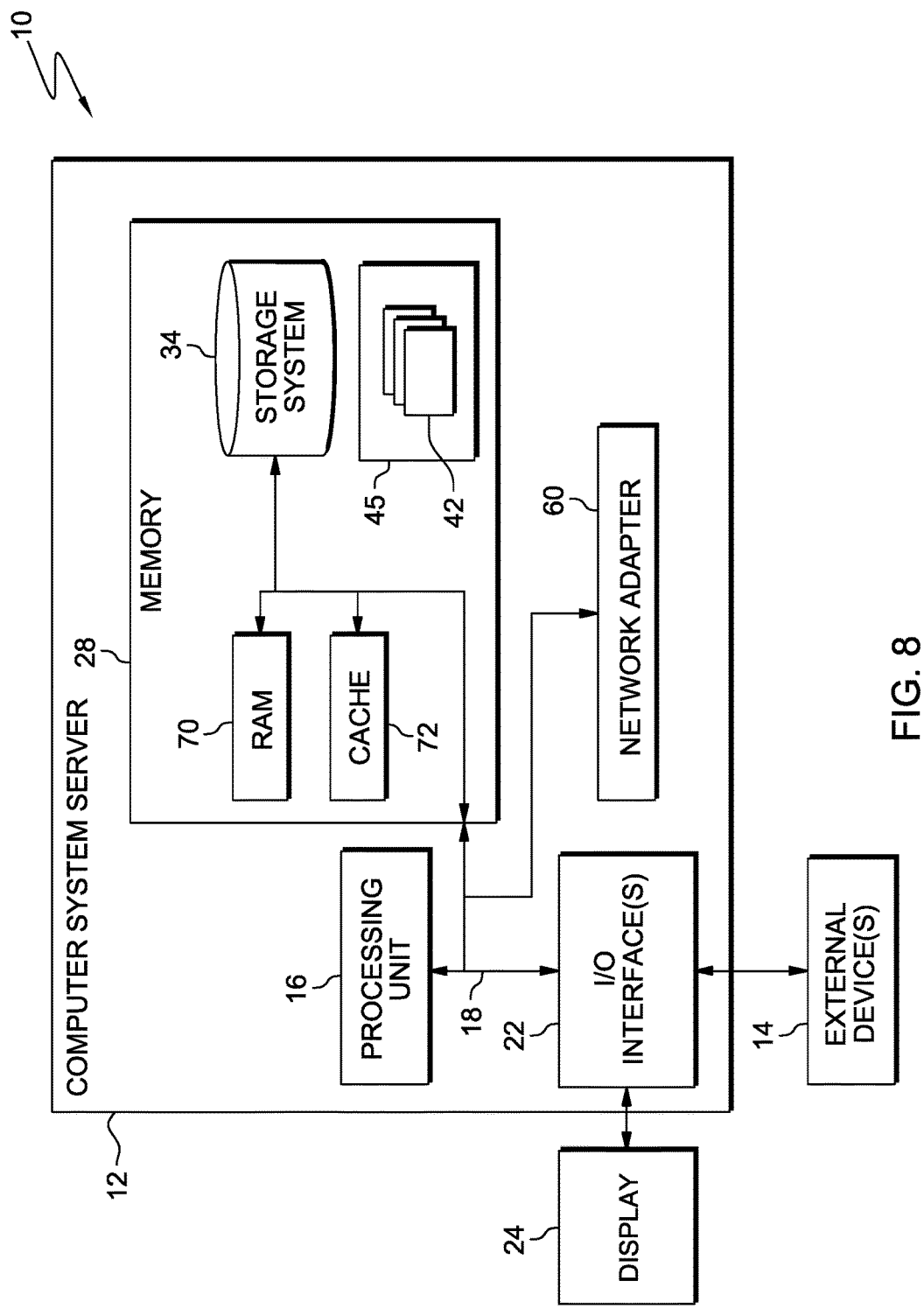
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 70 and/or cache memory 72. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 45, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 60 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
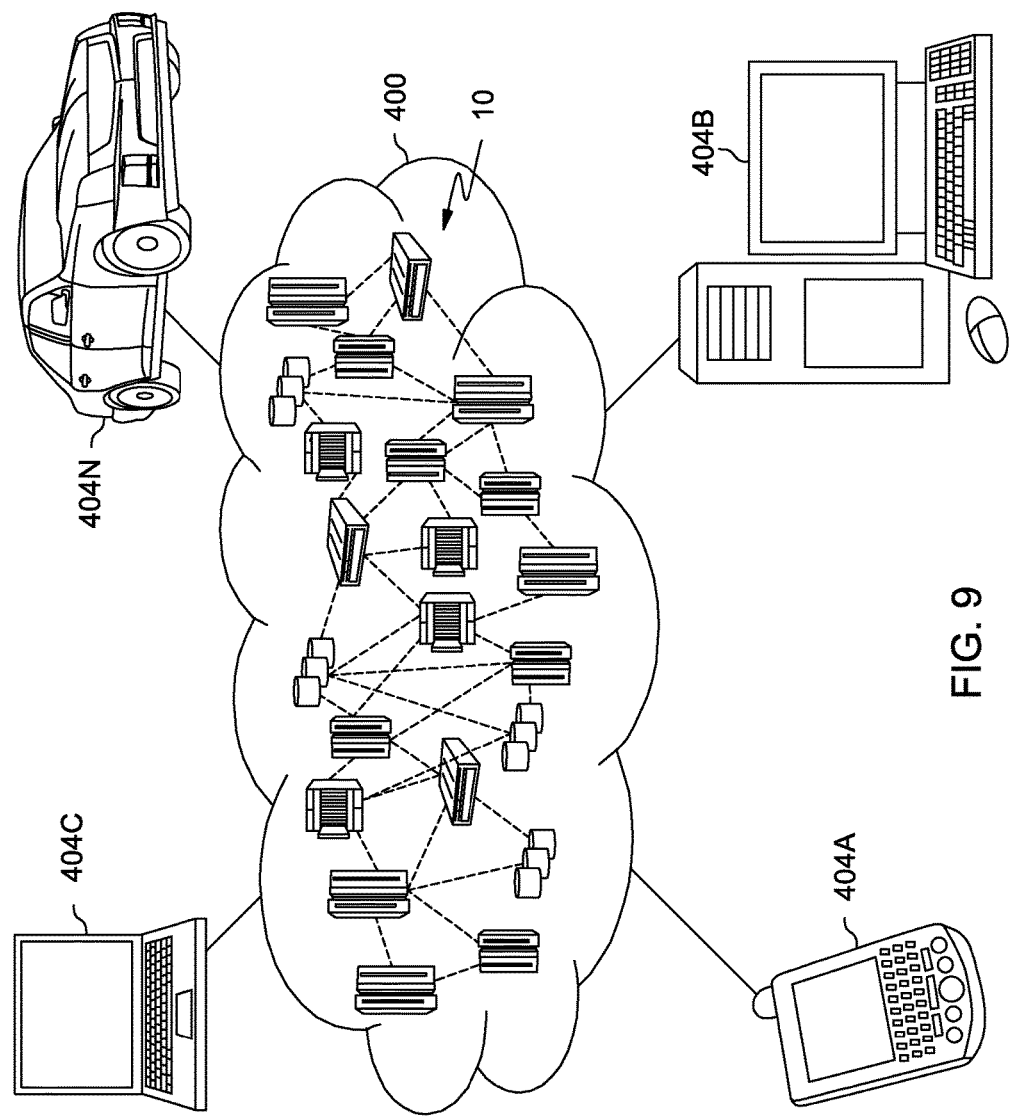
FIG. 9 depicts a cloud computing environment according to an embodiment of the present invention.

Referring now to FIG. 9, illustrative cloud computing environment 300 is depicted. As shown, cloud computing environment 400 comprises one or more cloud computing nodes 10 with which local computing devices used by cloud consumers, such as, for example, personal digital assistant (PDA) or cellular telephone 404A, desktop computer 404B, laptop computer 404C, and/or automobile computer system 404N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 404A-N shown in FIG. 9 are intended to be illustrative only and that computing nodes 10 and cloud computing environment 400 can communicate with any type of computerized device over any type of network and/or network addressable connection (e.g., using a web browser).

Figure 10:
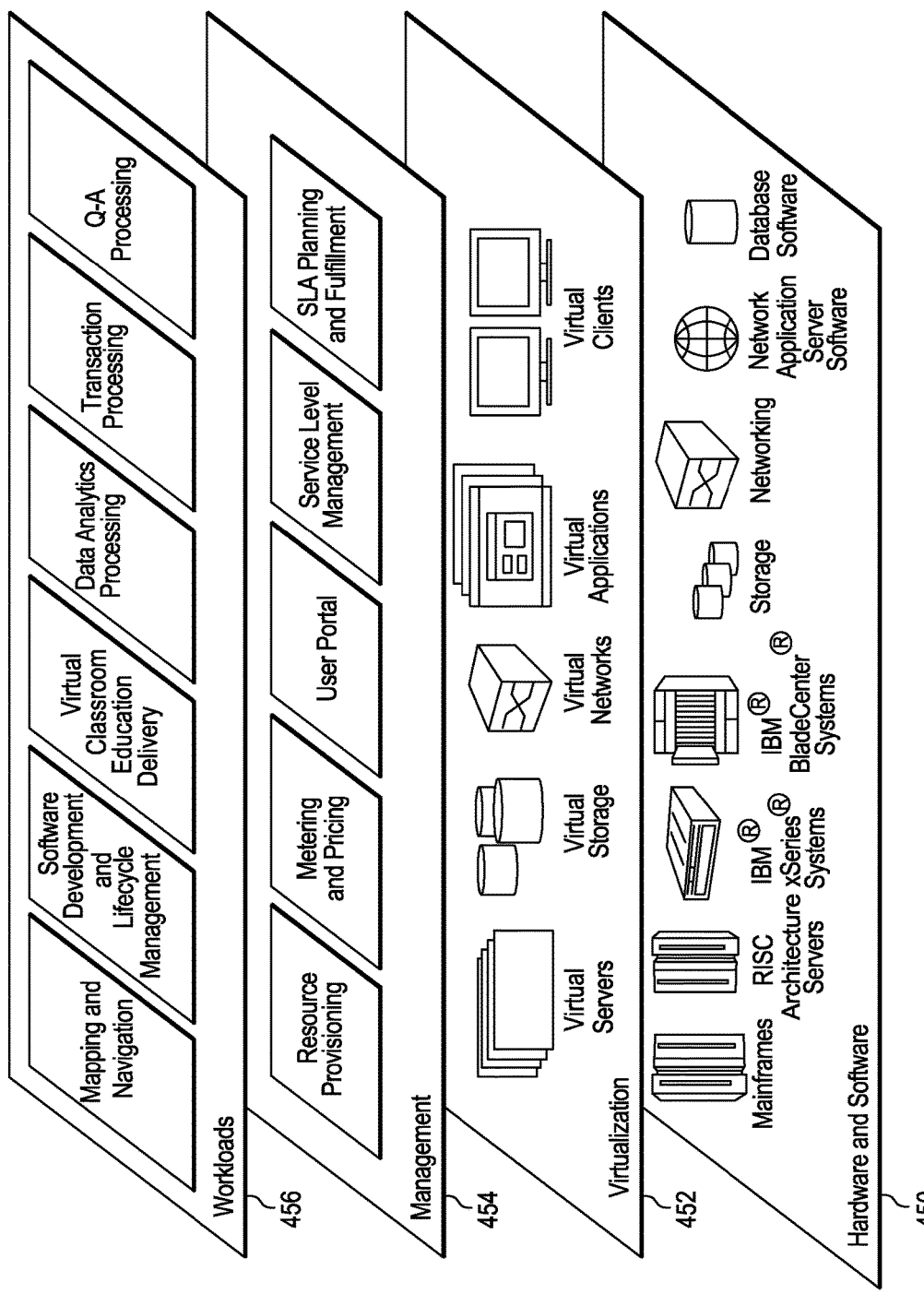
FIG. 10 depicts abstraction model layers according to an embodiment of the present invention.

Referring now to FIG. 10, a set of functional abstraction layers provided by cloud computing environment 450 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 450 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 452 provides an abstraction layer from which the following examples of virtual entities may be provided: virtual servers; virtual storage; virtual networks, including virtual private networks; virtual applications and operating systems; and virtual clients.

In one example, management layer 454 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 456 provides examples of functionality for which the cloud computing environment may be utilized. Examples of workloads and functions which may be provided from this layer include: mapping and navigation; software development and lifecycle management; virtual classroom education delivery; data analytics processing; transaction processing; and question-answer processing.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method for scoring candidate answers to questions, said method comprising:
   receiving a natural language question into a computer-implemented question answering system;
   applying syntactic analysis on said question to determine a lexical answer type (LAT) for said question;
   generating a second question based on said LAT;
   identifying one or more LAT instances by inputting said generated second question through a search engine;
   mapping said one or more LAT instances to nodes in said one or more taxonomies;
   identifying, in said one or more taxonomies, one or more supertype nodes associated with nodes of said mapped LAT instances, each said one or more supertype nodes identified based on a coverage value indicating a percentage of said one or more LAT instances mapped to nodes that are child nodes of said supertype node;
   generating, using a question answering system, one or more candidate answers to said question,
   mapping each said candidate answer to nodes in said one or more taxonomies;
   for each respective taxonomy, generating a type evaluation score for a candidate answer based on a linkage between said candidate answer node and a supertype node within the taxonomy;
   for each candidate answer, aggregating the type evaluation scores found in the one or more taxonomies; and
   generating one or more answers to said question, wherein each answer has an associated confidence score based at least in part on said aggregated type evaluation score.

2. The computer-implemented method as claimed in claim 1, wherein identifying one or more LAT instances is carried out by said search engine obtaining one or more answers to said second question from a corpus and assigning at least a portion of said answers as said one or more LAT instances.

3. The computer-implemented method as claimed in claim 2, wherein said corpus is a domain-specific knowledge base.

4. The computer-implemented method as claimed in claim 2, wherein said question answering system is a probabilistic system that obtains answers from a knowledge base comprising unstructured text.

5. The computer-implemented method as claimed in claim 1, wherein said supertype nodes are significant supertype entities.

6. The computer-implemented method as claimed in claim 5, wherein said significant supertype nodes are determined by calculating a recall loss between a parent node and child node within a taxonomy, and the parent node having the smallest recall loss exceeding a threshold is identified as a significant supertype entity node.

7. The computer-implemented method as claimed in claim 6, wherein the recall loss indicates the difference in the percentage of LAT instances covered by that LAT node compared to its child node in the taxonomy.

8. The computer-implemented method as claimed in claim 1, wherein the step of generating said type evaluation score comprises taking a maximum of said type evaluation scores for multiple taxonomies.

9. A system for scoring candidate answers to questions comprising:
a memory storage device;
a hardware processor, coupled to said memory storage device, for receiving instructions therefrom to configure said hardware processor to perform a method comprising:
receiving a natural language question;
applying syntactic analysis on said question to determine a lexical answer type (LAT) for said question;
generating a second question based on said LAT;
identifying one or more LAT instances by obtaining answers to said generated second question from a knowledge base;
mapping said one or more LAT instances to nodes in said one or more taxonomies;
identifying, in each said one or more taxonomies, one or more supertype nodes associated with nodes of said mapped LAT instances, each said one or more supertype nodes identified based on a coverage value indicating a percentage of said one or more LAT instances mapped to nodes that are child nodes of said supertype node;
generating, using a question answering system, one or more candidate answers to said question,
mapping each said candidate answer to nodes in said one or more taxonomies;
for each respective taxonomy, generating a type evaluation score for a candidate answer based on a linkage between said candidate answer node and a supertype node within the taxonomy;
for each candidate answer, aggregating their type evaluation scores found in the respective taxonomies; and
generating one or more answers to said question, wherein each answer has an associated confidence score based at least in part on said aggregated type evaluation score.

10. The system as claimed in claim 9, further comprising a storage device storing a corpus of electronic documents serving as a knowledge base from which to generate answers.

11. The system as claimed in claim 10, further comprising an electronic display device for displaying said one or more answers.

12. The system as claimed in claim 10, wherein said obtained answers are the one or more LAT instances.

13. The system as claimed in claim 9, wherein said supertype nodes are significant supertype entities.

14. The system as claimed in claim 13, wherein said significant supertype nodes are determined by calculating a recall loss between a parent node and child node within a taxonomy, and the parent node having the smallest recall loss exceeding a threshold is identified as a significant supertype node.

15. The system as claimed in claim 14, wherein said recall loss indicates the difference in the percentage of LAT instances covered by that LAT node compared to its child node in the taxonomy.

16. A computer program product for scoring candidate answers to questions, said computer program product comprising a computer readable storage medium having program instructions embodied therewith, said program instruction executable by a computer to cause said computer to:
receive, from an input device, a natural language question;
perform, by a processor, syntactic analysis on said question to determine a lexical answer type (LAT) for said question;
generate, by a processor, a second question based on said LAT;
identify, by a processor, one or more LAT instances by obtaining answers to said generated second question from a knowledge base;
map, by a processor, said one or more LAT instances to nodes of one or more taxonomies;
identify, by a processor, in said one or more taxonomies, one or more supertype nodes associated with nodes of said mapped LAT instances, each said one or more supertype nodes identified based on a coverage value indicating a percentage of said one or more LAT instances mapped to nodes that are child nodes of said supertype node;
generate, using a question answering system, one or more candidate answers to said question,
map each said candidate answer to nodes in said one or more taxonomies;
for each respective taxonomy, generate, by a processor, a type evaluation score for a candidate answer based on a linkage between said candidate answer node and a supertype node within the taxonomy;
for each candidate answer, aggregate their type evaluation scores found in the respective taxonomies; and
generate, by a processor, one or more answers to said question, wherein each answer has an associated confidence score based at least in part on said aggregated type evaluation score.

17. The computer program product of claim 16, wherein said obtained answers are the one or more LAT instances.

18. The computer program product of claim 16, further comprising program instructions to cause the computer to output said one or more answers to an electronic display device.

* * * * *